United States Patent
Da Costa Ribeiro De Miranda et al.

(10) Patent No.: US 9,397,463 B2
(45) Date of Patent: Jul. 19, 2016

(54) METHOD AND DEVICE FOR THE SIMULTANEOUS COMPRESSION AND CHARACTERIZATION OF ULTRASHORT LASER PULSES

(71) Applicants: Miguel Nicolau Da Costa Ribeiro De Miranda, Oporto (PT); Helder Manuel Paiva Rebelo Cerejo Crespo, Oporto (PT); Thomas Peter Andreas Fordell, Lund (SE); Cord Louis Arnold, Lund (SE); Anne L'Huillier, Lund (SE)

(72) Inventors: Miguel Nicolau Da Costa Ribeiro De Miranda, Oporto (PT); Helder Manuel Paiva Rebelo Cerejo Crespo, Oporto (PT); Thomas Peter Andreas Fordell, Lund (SE); Cord Louis Arnold, Lund (SE); Anne L'Huillier, Lund (SE)

(73) Assignee: UNIVERSIDADE DO PORTO, Oporto (PT)

( * ) Notice: Subject to any disclaimer, the term of this patent is extended or adjusted under 35 U.S.C. 154(b) by 116 days.

(21) Appl. No.: 14/364,668

(22) PCT Filed: Oct. 11, 2012

(86) PCT No.: PCT/IB2012/055522
§ 371 (c)(1),
(2) Date: Jun. 11, 2014

(87) PCT Pub. No.: WO2013/054292
PCT Pub. Date: Apr. 18, 2013

(65) Prior Publication Data
US 2014/0321486 A1    Oct. 30, 2014

(30) Foreign Application Priority Data
Oct. 11, 2011    (PT) .......................................... 105926

(51) Int. Cl.
G01J 11/00    (2006.01)
H01S 3/00    (2006.01)

(52) U.S. Cl.
CPC ............. *H01S 3/0092* (2013.01); *H01S 3/0057* (2013.01); *G01J 11/00* (2013.01)

(58) Field of Classification Search
CPC .................................... G01J 9/00; G01J 11/00
See application file for complete search history.

(56) References Cited

U.S. PATENT DOCUMENTS

2008/0049301 A1    2/2008  Krausz et al.
2009/0122819 A1*   5/2009  Dantus ............... G01B 9/02014
                                                           372/25
2009/0299693 A1*  12/2009  Kane et al. ............ H01S 3/0014
                                                           702/179

FOREIGN PATENT DOCUMENTS

WO    WO 2009/086122 A2    7/2009

OTHER PUBLICATIONS

Miranda et al. (2012). Characterization of broadband few-cycle laser pulses with the d-scan technique. *Optics Express*, 20(17), 18732-18743.

(Continued)

*Primary Examiner* — Jonathan Hansen
(74) *Attorney, Agent, or Firm* — John P. White; Gary J. Gershik; Cooper & Dunham LLP

(57) ABSTRACT

The present invention relates to a method and a device for the simultaneous compression and characterization of ultrashort laser pulses. An embodiment of the method comprises applying predetermined spectral phases to the pulse to be characterized so as to perform a dispersion scan; applying a nonlinear process to the pulse to be characterized; measuring the resulting signal from the application of the predetermined spectral phases and nonlinear process; applying a numerical iterative algorithm to the measured signal to retrieve the spectral phase of the pulse to be characterized. A few cycle laser pulse may be negatively chirped with a pair of DCM, the controllable amount of positive dispersion may be provided by a pair of glass wedges, one of them being translated for dispersion or phase control, and the frequency spectrum may be measured as well as also frequency resolved the dispersion dependent second-harmonic of the signal being phase modulated.

17 Claims, 5 Drawing Sheets

(56) References Cited

OTHER PUBLICATIONS

Miranda et al. (2012). Simultaneous compression and characterization of ultrashort laser pulses using chirped mirrors and glass wedges. *Optics Express*, 20(1), 688-697.

International Search Report, mailed Feb. 27, 2013 in connection with PCT International Application No. PCT/IB2012/055522, filed Oct. 11, 2012.
Written Opinion of the International Searching Authority, mailed Feb. 27, 2013 in connection with PCT International Application No. PCT/IB2012/055522, filed Oct. 11, 2012.

* cited by examiner

METHOD AND DEVICE FOR THE SIMULTANEOUS COMPRESSION AND CHARACTERIZATION OF ULTRASHORT LASER PULSES

CROSS-REFERENCE TO RELATED APPLICATIONS

This application is a §371 national stage of PCT International Application No. PCT/IB2012/055522, filed Oct. 11, 2012, claiming priority of Portuguese Patent Application No. 105926, filed Oct. 11, 2011, the contents of each of which are hereby incorporated by reference in their entirety.

TECHNICAL FIELD OF THE INVENTION

The present invention relates to a method and device for the simultaneous compression and characterization of ultrashort laser pulses.

SUMMARY

We present a simple and robust technique and device to characterize ultrashort laser pulses. It consists on applying a set of spectral phases to the pulses and measuring the corresponding spectra after a given nonlinear optical effect. This allows us to fully retrieve the unknown spectral phase of the pulses using numerical iterative algorithms that take advantage of the whole dataset in the spectral and phase domains, making the method very robust with respect to noise sensitivity and bandwidth requirements.

BACKGROUND

The characterization of ultrashort laser pulses is often as important as the generation process itself. Since no methods exist for the direct measurement of such short events, self-referencing techniques are usually employed.

Traditionally, ultrashort pulses have been characterized by nonlinear autocorrelation diagnostics (see, e.g., [1]), which are still widely used in many laboratories. Although relatively simple to implement, these fail to provide complete information (i.e., amplitude and phase) about the pulses. Still, several methods have been devised allowing for the reconstruction of the amplitude and phase of the pulses by combination of autocorrelation and spectral measurements (see, e.g. [2-4]). An important improvement over these techniques came in 1993 with the introduction of frequency resolved optical gating (FROG) [5,6]: by spectrally resolving an autocorrelation (or cross-correlation) signal, a sonogram-like trace is created from which complete characterization of a given pulse can be performed using an iterative algorithm. The quality of the retrieval is reflected by the corresponding FROG error, and the time and frequency marginals of the trace also provide a means to cross-check the results. There are many variants of FROG today, which all rely on spectrally resolving some time-gated signal. Other methods widely used today are related to the technique of spectral phase interferometry for direct electric-field reconstruction (SPIDER), first introduced in 1998 [7]. These methods do not rely on temporal gating, but instead on interferometry in the spectral domain: the spectrum of a given pulse is made to interfere with a frequency-shifted (sheared) replica of itself, and the resulting spectral interferogram is recorded. Although usually more complicated to set up, retrieving the spectral phase from a SPIDER trace is numerically much simpler than in FROG. Standard SPIDER however is very alignment sensitive and this can easily affect the measured pulse, as there is no straightforward means to determine the quality of the phase measurement. Recent SPIDER-related methods have been devised that allow overcoming this issue [8,9].

Recently, a new paradigm in pulse characterization based on phase scanning, known as multiphoton intrapulse interference phase scan (MIIPS) [10-12], was introduced. It consists in applying well-known spectral phases to the pulse to be characterized and measuring the resulting second-harmonic generation (SHG) signal. By finding which locally introduced amount of group delay dispersion (GDD) results in compression at a given wavelength, the original GDD of the pulse can be found, thereby allowing for the reconstruction of the unknown phase.

In all of the above techniques, the characterization of few-cycle laser pulses is still challenging and usually requires specific adaptations and materials in order to accommodate the associated broad bandwidths.

GENERAL DESCRIPTION OF THE INVENTION

Our method is related to the MIIPS technique in the sense that spectral phases are applied on the pulse to be measured; however both the experimental setup and the phase retrieval method are substantially different, and these will provide major advantages with respect to existing methods. A possible implementation of this technique consists on using a standard chirped mirror compressor setup typically composed of a set of dispersive mirrors and a pair of glass or crystal wedges. The chirped mirrors can be used to ensure that the pulse becomes negatively chirped, and then glass is added continuously until the pulse becomes as short as possible. We have found that measuring the generated SHG spectra around this optimal glass insertion allows us to fully retrieve the spectral phase of the pulse in a robust and precise way without the need of further diagnostic tools. The alignment is very easy compared to other techniques (no beam-splitting at any point, and no interferometric precision or stability are needed), and this method is also particularly relaxed with respect to the necessary bandwidth of the SHG process, so relatively thick (tens of micrometers) frequency doubling crystals can be employed even when measuring few-cycle pulses, whereas other techniques would require the use of more expensive and sometimes impractically thin nonlinear crystals, which also results in weaker nonlinear signals and correspondingly lower signal-to-noise ratios.

We now present a description of the principles and characteristics of embodiments of the method and system.

Consider an ultrashort laser pulse, which can be described by its complex spectral amplitude:

$$U(\omega) = |U(\omega)| \exp\{i\phi(\omega)\} \qquad (1)$$

The pulse is subject to a set of spectral phases and then some nonlinear process. For the simple case where the spectral phase is due to propagation through a piece of glass and the nonlinear process is second harmonic generation, the measured SHG spectral power as a function of glass thickness is proportional to:

$$S(\omega,z) = |\int (\int U(\Omega) \exp\{izk(\Omega)\} \exp(i\Omega t) d\Omega)^2 \\ \exp(-i\omega t) dt|^2 \qquad (2)$$

where z is the thickness of the glass and k(Ω) the corresponding frequency-dependent phase per unit length (or wavenumber) acquired by the pulse. In this expression, we simply take the original spectrum (amplitude and phase), apply a phase, and Fourier transform it to have the electric field in the time domain. Then SHG is performed (the time-dependent field is squared), and an inverse Fourier transform gives us the SHG spectrum. We perform a dispersion scan (we will call it d-scan for short) on the unknown pulse by introducing different thicknesses of glass and measuring the corresponding SHG spectra, which results in a two-dimensional trace. Note that other devices and components capable of imposing a spectral phase to the pulses could also be used, namely prisms, grisms, diffraction gratings, variable pressure gas cells and optical modulators such as acousto-optic, electro-optic and liquid crystal based devices.

This model assumes that the SHG process consists simply on squaring the electric field in time, which assumes an instantaneous and wavelength-independent nonlinearity. We will discuss the consequences of this approximation later. For simplicity, we will also use negative values for the glass insertion. While this is obviously unrealistic from an experimental point of view, mathematically it simply results from setting a given reference insertion as zero. Regardless of this definition, if we know the electric field for a given insertion, it will be straightforward to calculate it for any other insertion.

As an example, we show in FIG. 1 calculated dispersion-scanned SHG traces of some representative spectra, where the spectral phase (left) refers to zero insertion in the d-scans (right). In all cases we used the same power spectrum, which is an actual spectrum measured from the few-cycle ultrafast oscillator used in the next section, and applied different phase curves. The assumed glass is BK7, and the corresponding phase was calculated from well-known, precise and easily available Sellmeier equations. as will be apparent to the skilled person from observation of FIGS. 1(f) and 1(h), a property of d-scan compared to other methods is the sensitivity of the method to third-order dispersion, which produces a clear tilt in the traces.

The question now arises on how to find the electric field that generated a given scan. While the SHG at a given wavelength is mostly determined by the spectral power and phase at twice that wavelength in the fundamental field, there is always a coupling between all the generating wavelengths and all the generated ones.

In the present invention we use this coupling to our advantage: by using the whole trace's information together with the measured fundamental spectrum, and applying a numerical iterative algorithm, we are able to retrieve the fundamental spectral phase in a robust and precise way. This phase, together with the measured fundamental spectrum, give complete information about the pulse, both in the spectral and temporal domains (apart from a constant phase, also known as the carrier-envelope phase).

The spectral phase can be retrieved using several different methods. As an example, we used a Nelder-Mead [13] (or downhill simplex) algorithm, which proved very robust and reliable. We used the measured spectral power density, and by applying different phase curves, tried to minimize a merit function (the rms error between the measured and simulated scans, as commonly used in FROG retrievals), given by:

$$G = \mathrm{sqrt}\{1/(N_i N_j)\Sigma_{i,j}(S_{meas}(\omega_i, z_j) - \mu S_{sim}(\omega_i, z_j))^2\} \quad (3)$$

where $S_{meas}$ and $S_{sim}$ refer to the measured and simulated scans, respectively, and $\mu$ is the factor that minimizes the error. This factor, which can be easily found by differentiating the error with respect to $\mu$ is given by $$\mu = \Sigma_{i,j} S_{meas}(\omega_i, z_j) S_{sim}(\omega_i, z_j) / S_{sim}(\omega_i, z_j)^2, \quad (4)$$

and must be updated at each iteration. The problem can now be treated as a general optimization problem. Traditionally, there are several ways to solve this type of problem. For example, we can write the phase as a function of a set of parameters (or dimensions) and the function to be minimized is the error G. To make things easier for the algorithm, the phase function should be described in a convenient basis. As commonly required, we want to minimize the number of dimensions in the problem while still accurately describing the phase, and we want a basis whose functions are as uncoupled as possible, to prevent the algorithm from getting stuck on local minima. Different approaches can be taken here. Some authors choose to allow each point of the sampled complex spectral or time amplitude to be an independent variable (e.g. [14]), and as such, the number of dimensions of the problem will be determined by the sampling. Another (very common) choice is to use a Taylor expansion as a basis. In the former case, the large number of parameters makes the algorithm rather slow, while in the latter there is a high degree of coupling between the even terms (i.e., second order dispersion, fourth order dispersion, etc.) as well as between the odd terms (third order dispersion, fifth order dispersion, etc.). This base would still be a good choice (if not optimal) for simple phase functions, such as the ones introduced by glasses, gratings, prism compressors, etc., which are accurately described in such a way.

In our case, we chose to write the phase as a Fourier series, since Fourier components are orthogonal. If one could access directly the error between the true phase and its Fourier representation, then each Fourier component could be directly determined by minimizing the error. While we don't have direct access to this error, the overall trace error is a good indicator of the phase error.

The way of finding new guesses for the spectral phase is not limited to the method presented above. Any method that does this, such as heuristic/metaheuristic methods, stochastic optimization or generalized projection methods can in principle be used. Other basis for the phase function can be used (including point by point guesses), and in absence of power spectrum knowledge, its reconstruction should also be possible by similar means. It is also possible to use common alternative representations of the spectral phase, namely its consecutive derivatives with respect to frequency (known as group delay, group delay dispersion, third-order dispersion, etc). Also, this method is not limited to using SHG: any other optical nonlinearity, such as sum-frequency generation, difference-frequency generation, the optical Kerr effect (and related nonlinear phase modulation effects), and third-harmonic generation, taking place in gases, solids, liquids or plasmas, and in fact any nonlinear effect that changes/affects the fundamental spectrum, can in principle be used with this method. The set of applied spectral phases can also be arbitrary as long as they affect the electric field temporally and consequently the generated nonlinear spectra.

FIG. 2 shows an example of a simulated spectrum (measured power spectrum and simulated phase), its d-scan, and the corresponding retrieved phase. The agreement between the retrieved and original phases is very good typically down to regions where the spectral power is around 2% of the peak spectral power.

Let us now consider a more realistic scenario of particular importance for the case of ultra-broadband few-cycle pulses, where the SHG signal cannot be described by simply squaring the electric field (the SHG process doesn't have infinite bandwidth). Even in this case, the SHG signal can be well described by the simple model (Eq. 2), provided that the spectrum is multiplied by an adequate spectral filter [15,16], so the measured signal is simply given by $$S_{meas}(\omega, z) = S_{ideal}(\omega, z) R(\omega), \quad (5)$$

where $R(\omega)$ is the spectral filter and $S_{ideal}$ denotes the ideal, flat response process (Eq. 2). If the spectrometer's response to the SH signal is unknown it can also be included in this response function.

For the previously discussed algorithm, it is crucial to have a well-calibrated signal, the reason being that the algorithm uses the overall error as a merit function. If the spectral response is not flat, the algorithm reacts by introducing fast phase variations on the regions with lower filter response, which makes the signal go out of the calculation box, therefore artificially reducing the overall error. There are several ways around this. The most straightforward would be to measure the spectrometer's response and simulate the SHG crystal spectral curve, but both are unfortunately difficult to obtain accurately. We discovered that the numerical integral of the trace over the thickness parameter (the frequency marginal), as given by $$M(\omega) = \int S(\omega, z) dz \qquad (6)$$

does not depend on the original spectral phase of the pulse, $\phi(\omega)$. It is then easy to simulate a trace for a Fourier-limited pulse (with a flat or linear spectral phase), and use its marginal to calibrate the measured one. Comparing the simulated scan's marginal to the measured scan's marginal it is straightforward to calculate the spectral response $R(\omega)$. Knowing the filter response, we can either divide the experimental trace by it, or include it in the retrieval process, by multiplying it by the "ideal" simulated trace, in each iteration. If the filter has zeros in the spectral region of interest, then we are left only with the latter option. We have successfully calibrated experimental scans this way.

We also devised another approach, which proved to be much easier to implement and more flexible. It consists in allowing the error function to be minimized for each wavelength, with the overall error being a weighted function of all these errors. So, given an experimental and simulated scan, the factor that minimizes the error for each frequency component $\omega_i$ is given by:

$$\mu_i = \Sigma_j S_{meas}(\omega_i, z_j) S_{sim}(\omega_i, z_j) / S_{sim}(\omega_i, z_j)^2 \qquad (7)$$

and the overall error is:

$$G = \text{sqrt}\{1/(N_i N_j) \Sigma_{i,j} (S_{meas}(\omega_i, z_j) - \mu_i S_{sim}(\omega_i, z_j))^2\} \qquad (8)$$

Now, by using this new error function, the algorithm effectively works on matching the trace's features, instead of simply trying to match the trace as a whole. If the trace is successfully retrieved, then the minimizing factors $\mu_i$ will also give us the complete filter response. What is perhaps more remarkable with this approach is that it is possible to correctly retrieve the phase for a certain frequency, even if there is no signal at the corresponding SHG (doubled) frequency. This can be seen from the examples in FIG. 3: even in the case where the simulated filter response is clipped to zero (therefore making it impossible to calibrate the signal), the phase is nevertheless correctly retrieved across the whole spectrum. This would not be possible with the MIIPS retrieval technique.

A simplified diagram of our experimental setup is given in FIG. 4. It consists on an ultrafast oscillator (Femtolasers Rainbow CEP, not shown), four double-chirped mirror pairs (Venteon GmbH), followed by BK7 AR-coated glass wedges with an 8° angle, an off-axis aluminum-coated parabola (50 mm focal length) and a standard 20 μm thick BBO crystal cut for type I SHG at 800 nm.

A dispersion scan was performed with very fine sampling in thickness (250 acquired spectra, with a thickness step of about 20 μm). Because of the relatively small angle of the wedges, this thickness step corresponds to a wedge translation step of more than 100 μm (and even this is much more than necessary, as a thickness step of 100 μm is typically enough, which corresponds to a translation step of more than 500 μm) so the positioning precision is quite undemanding compared to interferometric methods.

To test the precision of the method, a bootstrap analysis was performed: from this fine scan, five scans were extracted, all with different datasets, by using every fifth spectrum (i.e., scan 1 uses steps 1, 6, 11, etc., scan 2 uses steps 2, 7, 12, etc.). The background signal was subtracted, and when the resulting signal was negative, we kept it as such, instead of making it zero. This way we allow for the retrieved data to (correctly) tend to zero where it should, instead of forcing the algorithm to try to converge to half of the noise level.

The two different retrieval techniques described above were used for each scan thus yielding a total of ten retrievals. In the first case we calibrated the scan from its frequency marginal (i.e., by forcing the integral over z to be the same for the measured scan and for a simulated scan corresponding to the Fourier limit case), and in the second we allowed the error to adjust to each spectral slice.

In all cases, the retrievals are very similar so we grouped them all together for the statistical analysis (FIG. 5). The "zero" insertion here refers to the insertion at which the pulse is shortest, and for which the phase and time reconstructions are shown. It actually corresponds to about 3 mm of BK7 glass. The retrieved pulse width was 7.1±0.1 fs. The pulses clearly show the effect of residual uncompensated third order dispersion (also evidenced by the tilt in the corresponding d-scan trace) in the form of post-pulses. Note that there is no time-direction ambiguity on the retrieved pulse. Even if the laser source and setup as it is don't allow for any shorter pulses, the precise phase measure actually allows one to re-design the compressor if necessary, i.e. by using different glasses and/or chirped mirrors.

It is worth noting that the phase retrieval is very robust even in regions of very low spectral power density. And, considering there is very little SHG signal above 470 nm and below 350 nm, it is surprising at first that the phase is consistently retrieved well beyond 940 nm and below 700 nm. Again, this is due to the coupling between all the frequency components on the trace and the original spectrum. As with FROG, the key aspect of this technique is the data redundancy in the dispersion scan SHG trace.

As with the simulated scans, it was possible to fully retrieve the filter response of the system as well. With both methods we retrieved very similar curves for all traces.

The phase retrieval technique used in this demonstration of the technique is certainly not the only possible one. Even if it worked extremely well for our purposes, better, faster and more elegant numerical approaches are certainly possible and will be studied in future work.

For instance, different basis sets can be used to describe the phase, apart from the Fourier series described above. A simple way to avoid the algorithm getting stuck in local minima is to switch basis whenever this happens: often, a local minimum in a given basis is not a local minimum in another basis, so the simple switching of basis can be helpful whenever the algorithm stalls. It is also possible to use alternative representations of the spectral phase, such as the group delay and the group delay dispersion. The resolution (number of points) used for a given representation can also be adjusted if required, by using interpolation between each iteration step, so as the algorithm converges, the resolution is increased by adding more degrees of freedom. Another advantage of using a multi-dimensional minimization technique is its extreme flexibility. For example, we tried feeding the algorithm the glass thickness spacing as a parameter, and it correctly found the known experimental value.

After having the field well characterized for a given insertion it is straightforward to calculate it for any other insertion by applying the known phase curve of the glass to the retrieved phase. One can then simply find the insertion that minimized the pulse length and move the wedges into the corresponding position, which results in optimum pulse compression.

In conclusion, we have described and demonstrated a simple, inexpensive and robust method to characterize ultrashort laser pulses based on iterative phase retrieval from dispersion scans, using chirped mirrors, wedges and a standard (relatively thick) SHG crystal. For the shown implementation, the alignment is very easy (no beam-splitting at any point, and no interferometric precision or stability are needed). In our case, the main part of the setup (chirped mirrors and wedges) was already being used for pulse compression, so there was no need to employ other characterization methods. This is the situation where this technique is especially useful. It is of course possible to use the system as a standalone device. Also, we are not as limited by the phase-matching restrictions of the SHG crystal as with other techniques, which allows for the characterization of extremely broad bandwidth pulses without having to sacrifice SHG efficiency by employing unpractically thin crystals. As a result, we were able to obtain a simple, efficient and robust device capable of successfully measuring ultrashort light pulses down to the 2-3 cycle range, which can in principle measure pulses down to the single-cycle limit. This new pulse measuring technique and device should be important to anyone that uses femtosecond laser pulses both in scientific research and in real-world uses, from medical to industrial applications.

The above described embodiments are obviously combinable. The following dependent claims set out particular embodiments of the invention.

REFERENCES AND LINKS

1. Jean-Claude M. Diels, Joel J. Fontaine, Ian C. McMichael, and Francesco Simoni, "Control and measurement of ultrashort pulse shapes (in amplitude and phase) with femtosecond accuracy," Appl. Opt. 24, 1270-1282 (1985)
2. Naganuma, K.; Mogi, K.; Yamada, H.; "General method for ultrashort light pulse chirp measurement," Quantum Electronics, IEEE Journal of, vol. 25, no. 6, pp. 1225-1233, June 1989
3. A. Baltuška, Z. Wei, M. S. Pshenichnikov, D. A. Wiersma, and R. Szipöcs, "All-solid-state cavity-dumped sub-5-fs laser," Appl. Phys. B 65, 175 (1997)
4. J. W. Nicholson, J. Jasapara, W. Rudolph, F. G. Omenetto, and A. J. Taylor, "Full-field characterization of femtosecond pulses by spectrum and cross-correlation measurements," Opt. Lett. 24, 1774-1776 (1999).
5. Kane, D. J.; Trebino, R.; "Characterization of arbitrary femtosecond pulses using frequency-resolved optical gating," Quantum Electronics, IEEE Journal of, vol. 29, no. 2, pp. 571-579, February 1993
6. Rick Trebino and Daniel J. Kane, "Using phase retrieval to measure the intensity and phase of ultrashort pulses: frequency-resolved optical gating," J. Opt. Soc. Am. A 10, 1101-1111 (1993).
7. C. Iaconis and I. A. Walmsley, "Spectral phase interferometry for direct electric-field reconstruction of ultrashort optical pulses," Opt. Lett. 23, 792-794 (1998)
8. Adam S. Wyatt, Ian A. Walmsley, Gero Stibenz, and Gunter Steinmeyer, "Sub-10 fs pulse characterization using spatially encoded arrangement for spectral phase interferometry for direct electric field reconstruction," Opt. Lett. 31, 1914-1916 (2006)
9. Jonathan R. Birge, Helder M. Crespo, and Franz X. Kärtner, "Theory and design of two-dimensional spectral shearing interferometry for few-cycle pulse measurement," J. Opt. Soc. Am. B 27, 1165-1173 (2010)
10. Vadim V. Lozovoy, Igor Pastirk, and Marcos Dantus, "Multiphoton intrapulse interference. IV. Ultrashort laser pulse spectral phase characterization and compensation," Opt. Lett. 29, 775-777 (2004).
11. Bingwei Xu, Jess M. Gunn, Johanna M. Dela Cruz, Vadim V. Lozovoy, and Marcos Dantus, "Quantitative investigation of the multiphoton intrapulse interference phase scan method for simultaneous phase measurement and compensation of femtosecond laser pulses," J. Opt. Soc. Am. B 23, 750-759 (2006).
12. Yves Coello, Vadim V. Lozovoy, Tissa C. Gunaratne, Bingwei Xu, Ian Borukhovich, Chien-hung Tseng, Thomas Weinacht, and Marcos Dantus, "Interference without an interferometer: a different approach to measuring, compressing, and shaping ultrashort laser pulses," J. Opt. Soc. Am. B 25, A140-A150 (2008).
13. Nelder, John A. and R. Mead, "A simplex method for function minimization," Computer Journal 7: 308-313 (1965).
14. J. W. Nicholson, F. G. Omenetto, D. J. Funk, and A. J. Taylor, "Evolving FROGS: phase retrieval from frequency-resolved optical gating measurements by use of genetic algorithms," Opt. Lett. 24, 490-492 (1999).
15. Andrius Baltuška, Maxim S. Pshenichnikov, and Douwe A. Wiersma, "Amplitude and phase characterization of 4.5-fs pulses by frequency-resolved optical gating," Opt. Lett. 23, 1474-1476 (1998)
16. Baltuška, A.; Pshenichnikov, M. S.; Wiersma, D. A.; "Second-harmonic generation frequency-resolved optical gating in the single-cycle regime," Quantum Electronics, IEEE Journal of, vol. 35, no. 4, pp. 459-478 (1999).

In short, the disclosed methods and apparatuses can be used in standalone high-performance pulse compression and characterization systems, or can be implemented on already existing optical pulse compressors and/or shapers. They use the compressor as the diagnostic itself, obviating the need of additional pulse measurement devices. The practical implementation can be very simple compared to other ultrashort pulse diagnostic techniques, and a new algorithm allows retrieving the spectral phase of the pulses in a very robust way and with bandwidth and noise restrictions that are more relaxed compared to other techniques. The resulting dispersion-scanned traces are intuitive, have no time-direction ambiguities, and show directly the presence of residual third (and higher) order dispersion in the pulses. Also, and unlike in other pulse measurement techniques, no beam-splitting, high-resolution translation and interferometric stability or precision are required. The inventors built a device that implements this technique in a scanning mode (like many other optical pulse diagnostics) where pulse retrieval is performed for a set of pulses that are assumed identical. The device and method have been successfully demonstrated with low-energy few-cycle pulses from laser oscillators and higher-energy pulses from a hollow-fiber and chirped mirror compressor.

DESCRIPTION OF THE FIGURES

The following figures provide preferred embodiments for illustrating the description and should not be seen as limiting the scope of invention.

Figure 1:
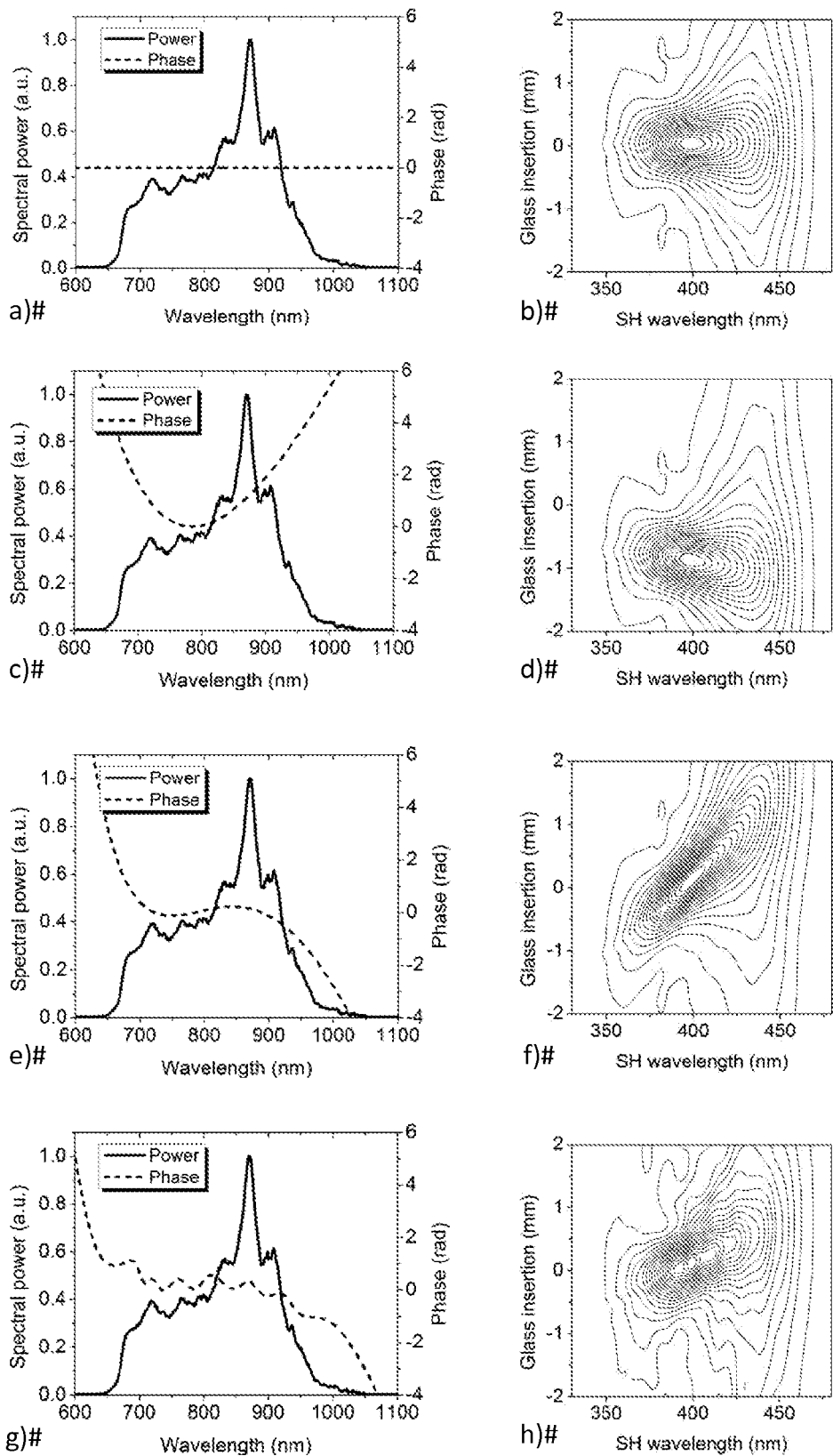
FIG. 1: Schematic representation of an example of simulated dispersion scans, where the spectral phase plots on the left correspond to zero insertion in the scans on the right. (a) Fourier limited pulse. (b) Linearly chirped pulse (second-order dispersion only)—this causes mostly a translation of the trace with respect to the glass insertion, but since the glass itself doesn't introduce pure second order dispersion, the pulse is never completely compressed for any insertion, so it appears slightly tilted. (c) Pulse with third-order dispersion only, around 800 nm, which results in a clear tilt in the trace with respect to the previous cases. (d) A more complex phase curve, mostly third-order dispersion and some phase ringing.
Figure 2:
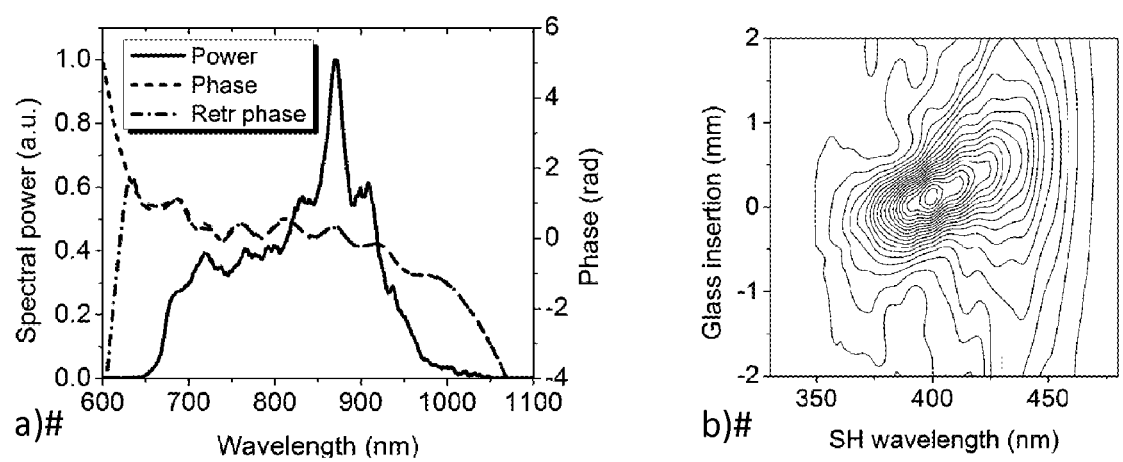
FIG. 2: Schematic representation of an example of scan and phase retrievals from FIG. 1(h).
Figure 3:
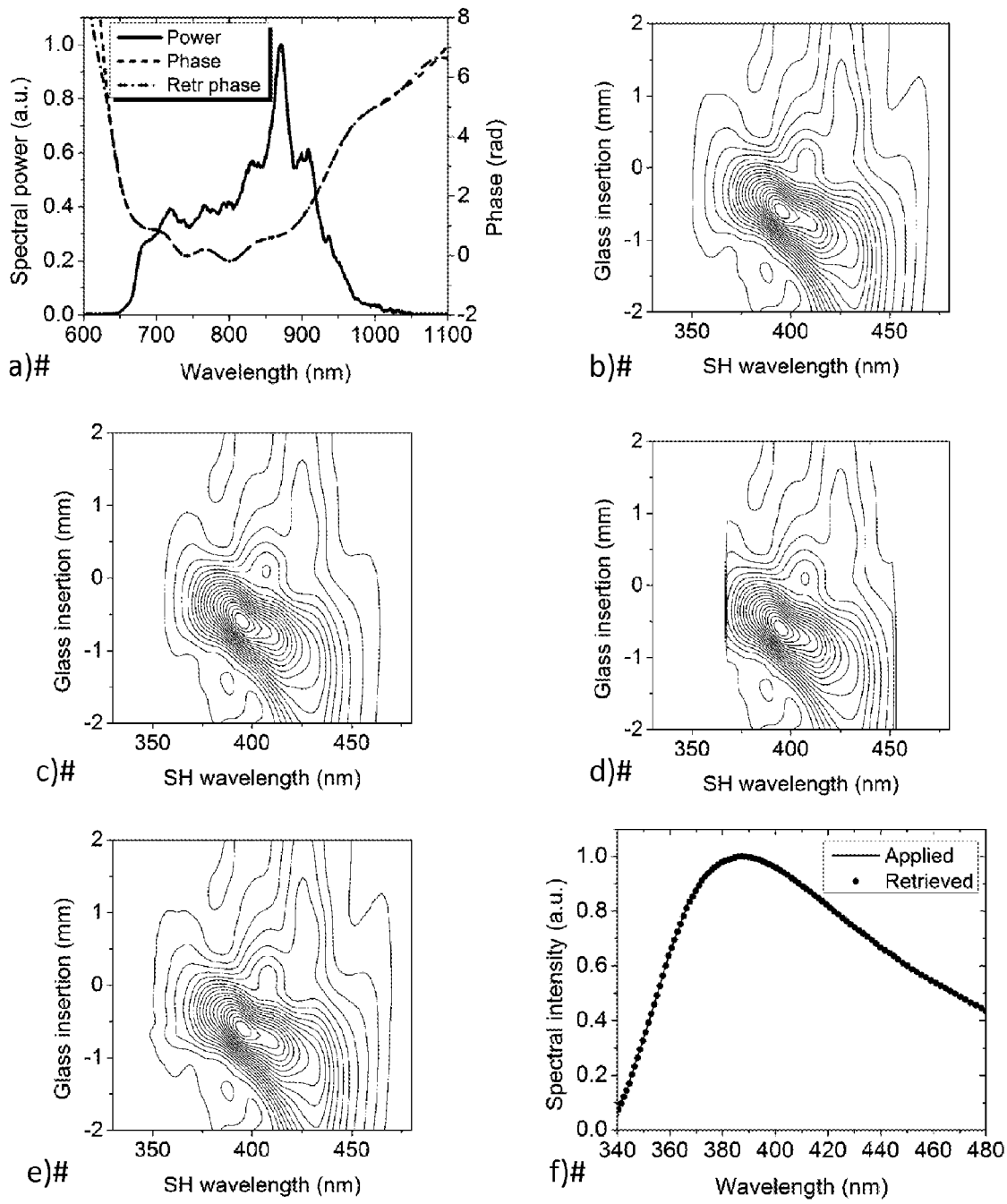
FIG. 3: Schematic representation of an example of simulated traces including spectral filters in the SHG process. (a) Simulated spectrum, where the retrieved phase shown is for the worst case scenario, (d). (b) Ideal trace. (c) Ideal trace multiplied by a typical SHG crystal efficiency curve. (d) Same as (c), but clipped at around 370 nm and 440 nm. (e) Retrieved "ideal" scan from scan (d)—the retrieved scan is supposed to be identical to scan (b). (f) Applied and retrieved spectral filters from (c). The retrieved filter is made up of the error that minimizes the coefficients $\mu_r$ for each wavelength.
Figure 4:
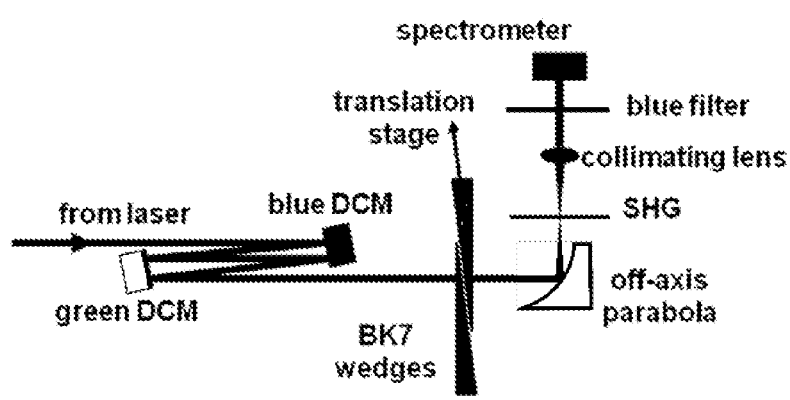
FIG. 4: Schematic representation of an experimental setup. The laser is a Femtolasers Rainbow CEP (80 MHz repetition rate, energy per pulse of 2.5 nJ, FWHM Fourier limit of 6 fs), SHG is a 20 μm thick BBO crystal. The double chirped mirrors (DCM) are made in matched pairs to minimize phase ringing, and the aluminum off-axis parabola has a 50 mm focal length.
Figure 5:
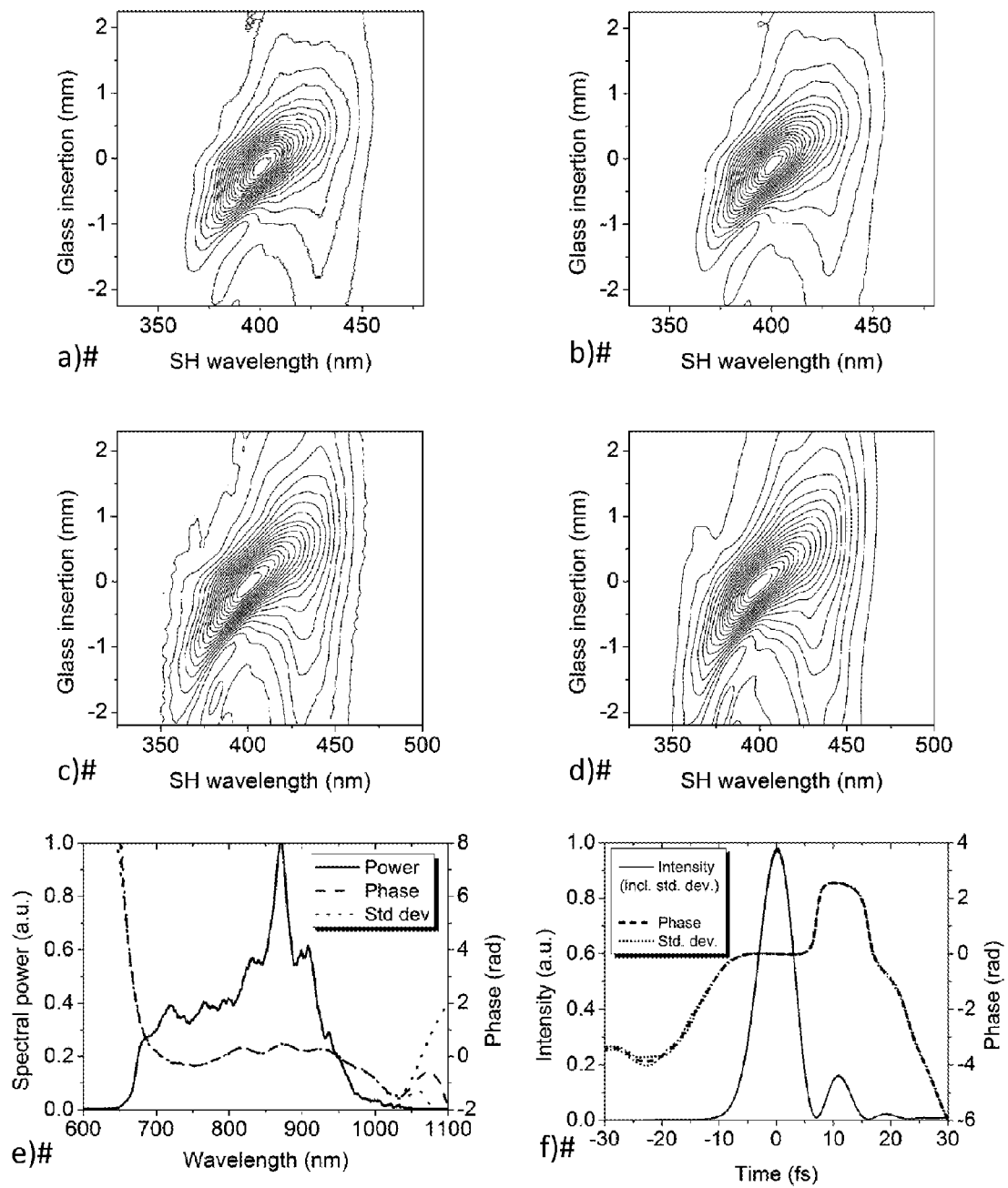
FIG. 5: Schematic representation of measured and retrieved scans. (a) Raw scan, made up of 250 spectra. (b) Scan made from 50 spectra out of the raw scan. (c) Calibrated scan, by using the frequency marginals in Eq. 6. (d) Retrieved scan from (c)—either retrieving from (c) or (b), the results are very similar. Plots (e) and (f) show a bootstrap analysis on spectrum and time, from 10 different retrievals. From the original scan with 250 spectra, 5 different scans were obtained using different datasets. The two different techniques were used on each dataset. The red curve is the average value, and the blue curves are one standard deviation above and below the average. Retrieved pulse width at FWHM was 7.1±0.1 fs.

The invention claimed is:

1. A method for simultaneous compression and characterization of ultrashort laser pulses comprising:
    (a) emitting an ultrashort laser pulse;
    (b) applying a set of predetermined spectral phases to the ultrashort laser pulse, continuously or in a stepwise fashion, so as to perform a dispersion scan, with the pulse duration crossing a minimum during the scan;
    (c) applying a nonlinear process to the ultrashort laser pulse for each applied spectral phase;
    (d) obtaining a two-dimensional measured dispersion scan trace by measuring spectra of a signal generated as a result of the nonlinear process as a function of the applied spectral phases;
    (e) measuring a spectrum of the ultrashort laser pulse or retrieving it from the measured signal;
    (f) retrieving a spectral phase of the ultrashort laser pulse by minimizing an error function using a numerical iterative algorithm; and
    (g) compressing the ultrashort laser pulse by applying the spectral phase for which said pulse becomes as short as possible for the retrieved spectral phase.

2. The method according to claim 1, wherein the applied nonlinear process comprises second harmonic generation or any other nonlinear effect that changes/affects the spectrum of the ultrashort laser pulse, which comprises sum-frequency generation, difference-frequency generation, the optical Kerr effect, and third-harmonic generation.

3. The method according to claim 1, wherein the numerical iterative algorithm comprises minimizing the rms error between the measured dispersion scan trace and a simulated dispersion scan trace calculated using different phase curves and the measured spectrum of the ultrashort laser pulse.

4. The method according to claim 1, wherein retrieving the unknown spectral phase of the ultrashort laser pulse is also possible in the absence of power spectrum knowledge by minimizing the rms error between the measured dispersion scan trace and a simulated dispersion scan trace calculated using different phase curves.

5. The method according to claim 4, wherein the simulated dispersion scan trace for the nonlinear process of the second harmonic generation is calculated by, for each applied spectral phase: (c1) applying a Fourier transform to the spectrum of the ultrashort laser pulse in order to obtain the corresponding electric field in the time domain; (c2) squaring the time-dependent field so as to perform the second harmonic calculation; (c3) and applying an inverse Fourier transform to obtain a spectrum of the second-harmonic.

6. The method according to claim 1 wherein the numerical iterative algorithm comprises minimizing an error function calculated by:
    (f1) obtaining the frequency marginal of the measured dispersion scan trace by evaluating the numerical integral of the measured dispersion scan trace over the dispersion parameter;
    (f2) obtaining the frequency marginal of the simulated dispersion scan trace by evaluating the numerical integral of the simulated dispersion scan trace over the dispersion parameter;
    (f3) using the property that the frequency marginal of the measured dispersion scan trace and the frequency marginal of the simulated dispersion scan trace are independent of the phase of the ultrashort laser pulse;
    (f4) or locally for each wavelength, with the overall error being a weighted function of all the local errors.

7. The method according to claim 1, further comprising correcting for a non-flat spectral detection response by:
    (h1) simulating a dispersion-scan trace for a Fourier-limited pulse;
    (h2) comparing the simulated dispersion scan's frequency marginal to the measured dispersion scan's frequency marginal in order to calculate the spectral detection response function;
    (h3) correcting for the spectral detection response either by dividing the measured dispersion scan trace by it or by including it in the iterative retrieval of the unknown spectral phase of the ultrashort laser pulse, by multiplying it by the simulated dispersion scan trace, in each iteration.

8. The method according to claim 1 comprising compensating for a non-flat spectral detection response by minimizing the error function for each frequency, with the overall error being a weighted function of the errors obtained by minimizing the error function for each frequency.

9. The method according to claim 1 wherein the spectral phase of the ultrashort laser pulse is written as a function of a set of parameters in a convenient basis, comprising a discrete sampling function, a Taylor expansion function, or a Fourier series function.

10. The method according to claim 1 wherein the phase of the ultrashort laser pulse is written in alternative representations comprising its consecutive derivatives with respect to frequency.

11. The method according to claim 1 wherein the error minimization is performed using an optimization method comprising heuristic methods, metaheuristic methods, stochastic methods and generalized projection methods.

12. The method according to claim 11, wherein said optimization method comprises the Nelder-Mead method.

13. A system configured to perform the method as claimed in claim 1, for simultaneous compression and characterization of ultrashort laser pulses, the system comprising: a dispersion section configured to apply the set of predetermined spectral phases to the ultrashort laser pulse, continuously or in the stepwise fashion, so as to perform the dispersion scan, with the pulse duration crossing the minimum during the scan; a nonlinear optical section applying the nonlinear process to the ultrashort laser pulse for said each applied spectral phase; a spectrometer for measuring the spectra of the signal generated as a result of the nonlinear process as the function of the applied spectral phases; a spectrometer to measure the spectrum of the ultrashort laser pulse; a data processing module configured to retrieve the spectral phase of the ultrashort laser pulse by minimizing the error function using the numerical iterative algorithm.

14. The system according to claim 13, wherein the dispersion section comprises chirped mirrors, glass wedges, glass in different thicknesses, prisms, grisms, diffraction gratings, variable pressure gas cells, and optical modulators such as acousto-optic, electro-optic and liquid crystal based devices.

15. The system according to claim 13, wherein the nonlinear optical section comprises gases, solids, liquids or plasmas configured to implement: second-harmonic generation or any other nonlinear effect that changes or affects the spectrum, such as sum-frequency generation, difference-frequency generation, the optical Kerr effect, and third-harmonic generation.

16. The system according to claim 13, wherein the nonlinear optical section comprises a second-harmonic generation crystal.

17. The system according to claim 13, wherein the dispersion section applies to the ultrashort laser pulse the spectral phase for which said pulse becomes as short as possible for the retrieved spectral phase.

* * * * *